United States Patent [19]

Carter et al.

[11] Patent Number: 5,419,528

[45] Date of Patent: May 30, 1995

[54] VIBRATION ISOLATION MOUNTING SYSTEM

[75] Inventors: Sam D. Carter, Orange; Paul H. Bastin, Garden Grove, both of Calif.

[73] Assignee: McDonnell Douglas Corporation, Huntington Beach, Calif.

[21] Appl. No.: 61,144

[22] Filed: May 13, 1993

[51] Int. Cl.$^6$ .......................................... F16M 13/00
[52] U.S. Cl. .................................... 248/585; 248/542; 248/638
[58] Field of Search ............... 248/564, 542, 563, 567, 248/581, 585, 587, 591, 595, 638, 603, 636, 583, 592, 614

[56] References Cited

U.S. PATENT DOCUMENTS

| | | | |
|---|---|---|---|
| 1,832,368 | 11/1931 | Ell | 248/603 |
| 2,989,278 | 6/1961 | Hyman | 248/583 |
| 3,115,326 | 12/1963 | Barringer | 248/583 |
| 3,145,012 | 8/1964 | Kfoury | 248/638 X |
| 3,415,479 | 12/1968 | Loftus | 248/583 X |
| 4,101,102 | 7/1978 | Lloyd | 248/638 |
| 4,270,393 | 6/1981 | Osborne et al. | 248/583 X |
| 4,605,194 | 8/1986 | Binning et al. | 248/581 X |

FOREIGN PATENT DOCUMENTS 0047543 3/1984 Japan .................................... 248/638
0299339 12/1989 Japan .................................... 248/638

Primary Examiner—Karen J. Chotkowski
Attorney, Agent, or Firm—Donald E. Stout; Roger Turner; John P. Scholl

[57] ABSTRACT

A system is disclosed for mounting a vibration producing device onto a spacecraft structure and also for isolating the vibration forces thereof from the structure. The system includes a mount on which the device is securely mounted and inner and outer rings. The rings and mount are concentrically positioned. The system includes a base (secured to the structure) and a set of links which are interconnected by a set of torsion bars which allow and resist relative rotational movement therebetween. The set of links are also rotatably connected to a set of brackets which are rigidly connected to the outer ring. Damped leaf springs interconnect the inner and outer rings and the mount allow relative translational movement therebetween in X and Y directions. The links, brackets and base are interconnected and configured so that they allow and resist translational movement of the device in the Z direction so that in combination with the springs they provide absorption of vibrational energy produced by the device in all three dimensions while providing rotational stiffness about all three axes to prevent undesired rotational motions.

22 Claims, 2 Drawing Sheets

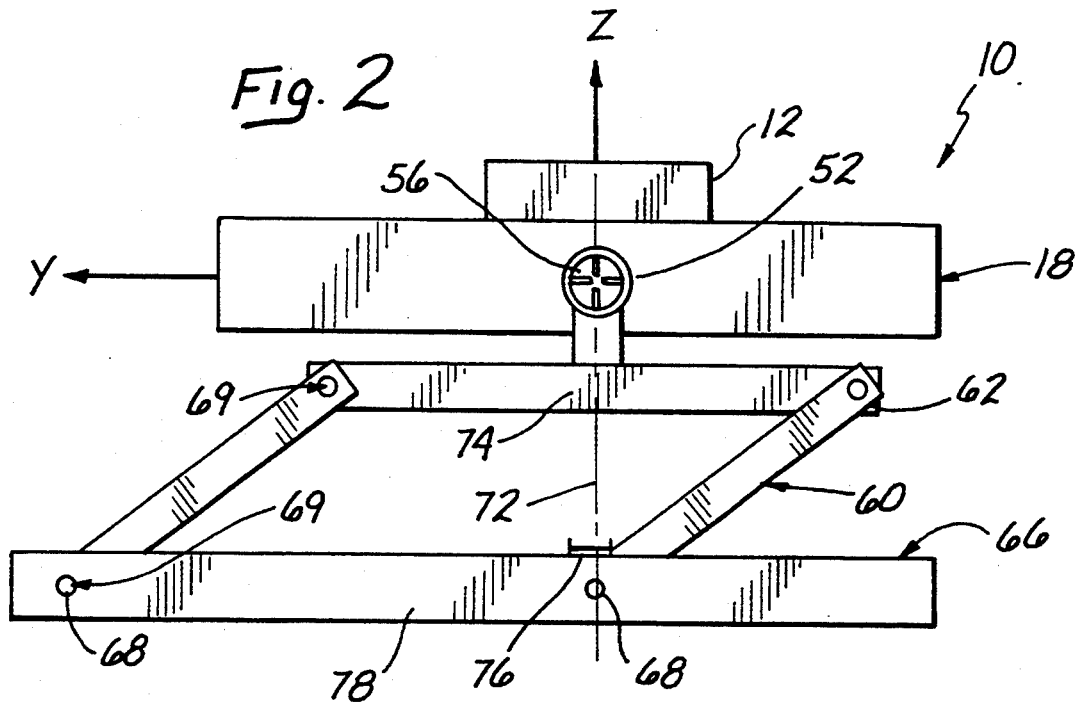
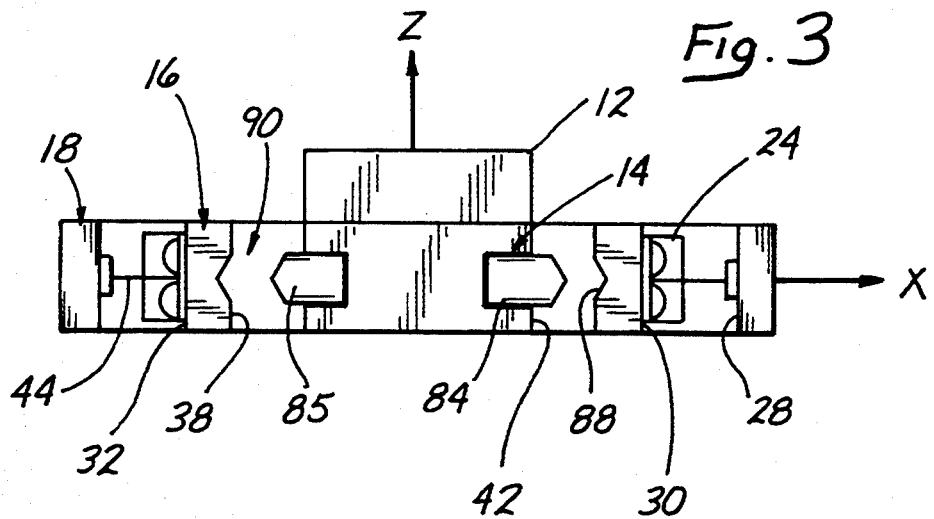

VIBRATION ISOLATION MOUNTING SYSTEM

The invention described herein was made in the performance of work under NASA Contract No. NAS2-13107 and is subject to the provisions of Section 305 of the National Aeronautics and Space Act of 1958 (42 U.S.C. 2457).

BACKGROUND OF THE INVENTION

The invention relates generally to systems for mounting a device onto another structure and, more particularly, to such systems which isolate the device from the structure so that vibration, torque and other motion-induced forces produced by the device do not adversely affect the structure and/or other subsystems and components mounted on the structure or proximal thereto. Such systems are particularly useful in space based environments in which many subsystems and components thereof are particularly sensitive to shock and vibration.

A mounting system for mounting a centrifuge onto an interior structure of a manned spacecraft is typically required to be stiff enough to resist applied torques due to spin-up and spin-down, aerodynamics, angular momentum (gyroscopic precession) and interaction by spacecraft crew personnel, while simultaneously providing a very soft platform for isolating the centrifuge from the spacecraft microgravity environment. Meeting these two conflicting requirements often resulted in a mounting system which was simply a compromise of both these requirements or which was very complex and/or expensive. In addition, since the space available in spacecraft to place the mounting system and centrifuge is typically limited, the mounting system is required to be compact. Moreover, another requirement of such a mounting system is that it eliminate stiction, i.e., resistance to start of motion. Stiction typically reduces the effectiveness of conventional isolation systems and introduces undesired noise and other disturbances into the spacecraft environment.

Many prior art mounting systems have been developed which provide a desired degree of shock and vibration isolation of a device such as a motor, centrifuge, gyroscope or other vibration or torque producing device. Some of these prior art designs, such the magnetic bearing and air bearing systems provide a very high degree of isolation but do so at a very high cost. In addition, such systems are not only very complex but, they also require an inordinate amount of energy for their proper operation. In addition, such systems do not provide the linear and angular stiffness which is required for many devices or applications.

Some prior art active systems provide a very high degree of isolation of devices. One of these types of active systems is a magnetic suspension system. The magnetic suspension system utilizes stator structures and an armature which is isolated from disturbance forces of the stators. However, such active systems have significant energy consumption. In addition, such active systems generally require a controller with associated software thereby resulting in a system which is inordinately complex and expensive to use, maintain and purchase.

Other more conventional passive isolation systems such as shock mount systems provide a certain degree of isolation of such devices from the surrounding environment. Many such systems utilize elastomeric mounting structures for damping purposes. However, an inherent disadvantage of such elastomeric mounting structures is that they may allow a degree of rotational movement which is undesirable for many applications. Elastomeric mounting structures may also introduce nonlinearity of the spring constant as a function of deflection i.e., stiffness may increase as the stroke or deflection increases, which increases the complexity of the design. Elastomeric mounts also generally inherently provide damping which adds complexity to the system design over systems that have independently operating spring and damping elements. The subject invention resolves these issues in that it: 1) provides the correct combination of linear and angular stiffness that allows the desired translational motion while preventing rotational motion, 2) provides a highly linear spring constant over the relatively large (approximately 0.5 inch) required defection range, and 3) provides independent control of stiffness and damping parameters.

A vibration isolation mounting system is thus needed which can protect the surrounding environment from vibration, torque and other motion-related forces produced by the device or subsystem which it holds. Such a system is also needed which is compact and provides a desired combination of linear and angular stiffness.

SUMMARY OF THE INVENTION

It is a principal object of the present invention to provide a mounting system for a device which isolates vibration and other motion-related forces produced by the device from a spacecraft interior structure or other structure on which the device is mounted.

It is also an object of the present invention to provide a mounting system for a device which isolates vibration and other motion-related forces produced by the device and which also provides torsional rigidity.

It is an object of the present invention to provide a mounting system for a device which isolates vibration and other motion-related forces produced by the device and which is compact.

It is another object of the present invention to provide a mounting system for a device which isolates vibration and other motion-related forces produced by the device and which is not power consumptive.

It is also an object of the present invention to provide a mounting system for a device which isolates vibration and other motion-related forces produced by the device and which is also provided with a locking means for immobilizing the system.

It is an object of the present invention to provide a mounting system for a device which isolates vibration and other motion-related forces produced by the device and which has a minimal number of components so that it is inexpensive to manufacture and maintain and provides relatively troublefree operation.

It is also another object of the present invention to provide a mounting system for a device which isolates vibration and other motion-related forces produced by the device and which also provides balance sensors to facilitate automatic control of the device.

It is still another object of the present invention to provide a mounting system for a device which isolates vibration and other motion-related forces produced by the device and which also prevents the effects of stiction of the device.

The vibration isolation mounting system is specifically designed for use in a spacecraft interior structure. Many spacecraft payloads, components and subsystems which are mounted on the spacecraft structure are very sensitive to vibration and other motion-related force disturbances above the micro G level. Consequently, it is important that devices producing such forces such as, for example, a centrifuge, vibrating equipment, rotating machinery and other similar types of devices or payloads be isolated from the spacecraft structure as well as components and subsystems thereof. Since electrical and other forms of power are typically carefully rationed during spacecraft missions, it is desirable that a vibration isolation mounting system require little or no power to perform its function. Additionally, since spacecraft typically do not have much space available for a mounting system, it is desirable that such a mounting system be compact. In this regard, the mounting system of the present invention has a minimal number of components and the total system requires little space relative to the size of the centrifuge or other similar device.

The system includes an outer ring, an inner ring concentrically mounted therewithin and a mount mounted within the inner ring. The centrifuge or other shock or vibration producing device is mounted on the mount. The rings and the mount are interconnected by means of leaf springs which yield to translational movement in the X and Y directions (transverse and radial) thereby resisting transference of motion or the forces of motion in these directions. The outer ring is generally rigidly mounted on parallelogram configured structures which are each composed of links, a base member and a bracket interconnected so as to allow rotational relative movement therebetween. However, the links, base member and bracket are dimensioned so that relative rotational movement of these structures results in essentially translational movement of the rings relative to the base. The parallelogram structures are preferably a pair of parallelogram structures mounted at diametrically opposed lateral portions of the outer ring. The links are connected to the base members via torsion bars which resist rotational movements of the links relative to the base members and also allow a desired degree of rotational movement relative thereto so that they act as an isolator by yielding to translational movement of the outer ring in the Z direction. The torsion bars and leaf springs consequently provide the system with a desired degree of linear softness in the X, Y and Z directions. The leaf springs are mounted so that the center of each of the springs acting along the X axis and interconnecting the mount and inner ring is connected to the outer surface of the mounts and the ends of these springs are connected to the laterally adjacent inner surfaces of the inner ring while the center of each of the springs acting along the Y axis and interconnecting the rings is connected to the outer surface of the inner ring and the ends of the springs acting along the Y axis are connected to the laterally adjacent inner surface of the outer ring. When the system is at rest, these springs are generally straight i.e., undeflected.

When torques are applied about the Z axis, forces are generated along the length of the leaf springs. The stiffness of the leaf springs in this direction is extremely high compared to their stiffness when forces are applied transverse to the leaf spring i.e., in a direction resulting in bending of the springs. Consequently, any torques applied about the Z axis are met with a very high torsional stiffness while stiffness in the X and Y directions remains small (or "soft") thereby allowing translational movement in the X and Y directions. When torques are applied about the X and Y axes, the leaf springs are subject to moments applied along the major axis of the leaf spring cross section. In this (major) axis, the stiffness in bending of the leaf spring is very high and the resulting system is essentially rigid with respect to torques about the X and Y axes. Consequently, the system also has a very high torsional stiffness about the X and Y axes. This torsional or rotational stiffness enables the system to resist the centrifuge spin-up/spin-down torques, gyroscopic precession torques, and other induced torques. In addition, the parallelogram configuration formed by the combination of the links, brackets and base members in conjunction with the relative rigidity of their interconnections also generally prevent relative rotational movement of the outer ring and base thereby providing a desired degree of angular stiffness to the system and also enabling the system to resist the torques described hereinabove. Moreover, the comparatively high angular stiffness of the system provides centrifuge rotor aerodynamic drag torque resistance and also maintains the alignment of the centrifuge with respect to adjacent structure during spacecraft motion. In addition, the angular stiffness of the system also generally prevents unwanted wobble or nutation of the centrifuge body. The parallelogram configuration structures allow translational movement in the Z direction while generally preventing rotational movement of the outer ring about the Z axis and preventing lateral movement of the outer ring i.e., in the X direction (approximately normal to the plane of the parallelogram structures), and also generally preventing significant lateral movement of the outer ring in the Y direction. The combination of the parallelogram structures and the spring structures consequently provide compliance with translational movement of the mount and device in the X, Y and Z directions.

Because the bending motion of the leaf springs and twisting motion of the torsion bars in the device occur without sliding movement of mechanical surfaces, the system is able to generally prevent the effects of stiction. The system is able to do this passively without the requirement of external power being supplied thereto and without the requirement of an inordinately complex control system. In addition, the system does not require a compressed air source in contrast to prior art systems such as air bearing systems or some levitation systems.

The concentric ring structure and the positioning of the mount within the rings provides a compact mounting system uniquely compatible with the centrifuge configuration. This feature enables the system to be utilized where available space is limited, such as in spacecraft environments.

The design of the system and its leaf spring and parallelogram structure types of isolators make it particularly well adapted for use in mounting and isolating a device which is relatively heavy i.e., approximately one ton. Since the effectiveness of the system in providing isolation is proportional to the mass of the device according to the formula:

$$f = \sqrt{\frac{k}{m}}$$

where f=frequency of oscillation;
k=stiffness of the system; and
m=mass of the system.

The more massive the device, the lower the frequency of oscillation thereof and concomitantly the softer the isolation system and the better the isolation provided.

Since the system is generally self-contained and works passively requiring no additional resources such as electrical power or compressed air sources, which are typically at a premium in spacecraft systems, the system is particularly well adapted for spacecraft environments. The system is also simple in construction with a minimal number of components and a minimal number of moving parts. In addition, since there is no control system required for the system to be effective, there is no software, computer or other subsystem required which would otherwise add significantly to the cost and complexity as well as the maintenance requirements of the system. Thus, the system is generally relatively inexpensive to purchase and maintain. In addition, since a control system is not required, the system is inexpensive and relatively trouble-free in operation.

BRIEF DESCRIPTION OF THE DRAWINGS

FIG. 2 is a side view of the system of the present invention showing the parallelogram structure in detail.

FIG. 3 is a cross-sectional view of the ring and mount structures of the system taken along lines 3—3 of FIG. 1.

DETAILED DESCRIPTION OF THE PREFERRED EMBODIMENT

Figure 1:
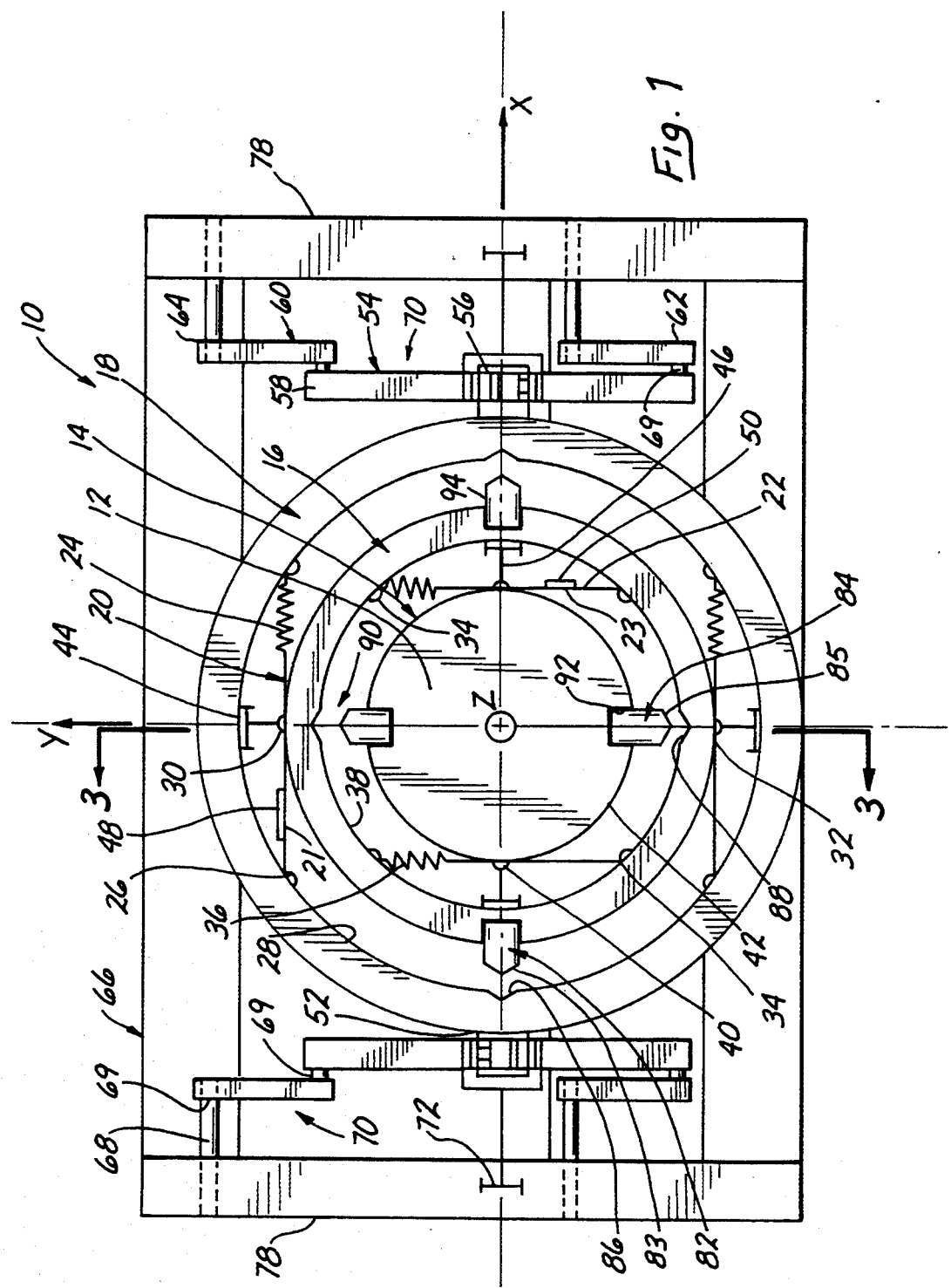
FIG. 1 is a top isometric view of the system of the present invention also showing a centrifuge mounted on the mount of the system.

Referring to the drawings, FIG. 1 shows the vibration isolation mounting system generally designated by the numeral 10 with a representative vibration or other motion related force producing device 12 mounted thereon. The device 12 is preferably a centrifuge, although it could also be a gyroscope or any one of a number of other devices or subsystems which produce motion inducing or induced forces that are likely to cause disturbances to structures on which the device 12 is mounted or to other structures or systems which are proximal to the device 12. The system 10 preferably includes a mount 14 on which the centrifuge 12 is preferably securely mounted by means of rivets, screws, nuts and bolts or other suitable mounting means (not shown).

The system 10 preferably also includes an inner ring 16 and an outer ring 18. Rings 16 and 18 are preferably generally circular. In addition, the mount 14 is also preferably generally circular. The inner ring 16 is preferably diametrically smaller than outer ring 18, and mount 14 is preferably diametrically smaller than inner ring 16. Inner ring 16 is preferably positioned within the outer ring 18 and mount 14 is preferably positioned within the inner ring 16. Rings 16 and 18 and mount 14 are preferably also positioned so that they are approximately concentric. In addition, rings 16 and 18 and mount 14 are preferably positioned so that they are generally coplanar thereby enhancing the compactness of the system 10.

The rings 16 and 18 and the mount 14 are preferably interconnected so as to allow a limited degree of relative movement therebetween. The inner ring 16 is preferably connected to the outer ring 18 by means of a first set of flexure members or springs 20. The set of springs 20 is preferably a pair of single bar leaf springs 20 and preferably includes a first set of auxiliary torque reaction springs 24 located at end portions 26 thereof. Preferably, springs 20 have the torque reaction springs 24 at only one of the end portions 26 of each of the springs 20. The first set of springs 20 is preferably connected at end portions 26 to inner surfaces 28 of the outer ring 18. Generally medial portions 30 of the first set of springs 20 are preferably connected to preferably diametrically opposed outer surface portions 32 of the inner ring 16. The springs 20 preferably have generally flat first surfaces 21 which are preferably approximately tangent to the surface portions 32 where connected thereto. The first set of auxiliary torque reaction springs 24 generally resist rotational movements of the inner ring 16 relative to the outer ring 18 and also generally absorb forces produced by such rotational movement. In addition, the first set of leaf springs 20 generally yields to and resists translational movement of the inner ring relative to the outer ring and also absorbs forces produced by such movement.

The interconnection of the inner ring 16 to the mount 14 is generally similar to the interconnection of the inner ring 16 and outer ring 18. A second set of flexure members or springs 22 preferably interconnects the inner ring 16 to the mount 14. The second set of springs 22 is preferably a pair of single bar leaf springs 22. Preferably, the second set of springs 22 also includes a second set of auxiliary torque reaction springs 36 at end portions 34 thereof. Preferably, only one of the end portions 34 of each of the second set of springs has the second set of auxiliary torque reaction springs 36. The end portions 34 of the second set of springs 22 are preferably connected to inner surfaces 38 of the inner ring 16. The medial portions 40 of the second set of springs are preferably connected to preferably diametrically opposed outer surface portions 42 of the mount 14. The springs 22 preferably have generally flat second surfaces 23 which are preferably approximately tangent to the surface 42 of the mount 14 where connected thereto. As with the first set of springs 20, the second set of auxiliary torque reaction springs 36 generally resists rotational movement of the mount 14 relative to the inner ring 16 and generally absorbs the forces thereof. In addition, the second set of leaf springs 22 generally yields to and resists translational movement of the mount 14 relative to the inner ring 16 and also generally absorbs the forces thereof. Although a leaf spring and torque reaction spring structure has been described hereinabove as comprising the preferred flexure member structures, other suitable flexure member structures which allow translational movement while generally preventing or allowing only a limited degree of rotational movement of the rings 16 and 18 and mount 14 may also be utilized. Due to the use of a three point spring connection, i.e., end and medial spring portions, the utilization of leaf springs which include auxiliary reaction springs as well as the circular configurations of the mounts and the rings, the system 10 provides a relatively high degree of angular stiffness while producing linear (or translational) softness.

A first set of dampers 44 are preferably mounted on the first set of springs 20. The first set of springs 20 generally absorbs the forces of translational movement of the inner ring 16 relative to the outer ring 18 by dampening the oscillation of relative movements thereof. A second set of dampers 46 is preferably mounted on the second set of springs 22. The second set of dampers 46 similarly absorbs the forces of translational movement of the mount 14 relative to the inner ring 16 by dampening oscillation of relative movements thereof.

A first set of strain gauges 48 is preferably mounted on the first set of springs 20. A second set of strain gauges 50 is preferably mounted on the second set of springs 22. First and second sets of strain gauges 48 and 50 sense forces applied to the sets of springs 20 and 22 in order to provide static balance sensing of the device 12. The outputs of these gauges (or sensors) 48 and 50 are preferably used to control the motion of balancing masses located on the rotor of the centrifuge 12.

The outer ring 18 is preferably connected at diametrically opposed outer portions (or locations) 52 thereof to a set of brackets 54. The set of brackets 54 are preferably generally rigidly connected to the outer ring 18 by means of preferably a set of trunnions 56. The set of brackets 54 are preferably rotatably connected at end portions 58 thereof to a set of links 60 at upper end portions 62 thereof. The set of links 60 is preferably also connected at lower end portions 64 thereof to a base 66. More specifically, the set of links 60 is preferably rotatably connected to a set of base members 78 which are preferably integral with base 66. The lower end portions 64 of links 60 are preferably rotatably connected to the base 66 by means of a set of connecting means 68 (preferably a set of torsion bars 68) which generally yield to and resist relative rotational movements of the set of links 60 and the base 66. Alternatively, however, the torsion bars 68 may interconnect the set of links 60 to the set of brackets 54. In addition, there may alternatively be torsion bars 68 which interconnect both the links 60 and base 66 as well as the links 60 and brackets 54. The set of links 60, the set of brackets 54 and the base members 78 are preferably dimensioned and the connection points 68 are preferably located so that links 60 are preferably parallel to each other and the set of brackets 54 and base members 78 are preferably parallel to each other i.e., they preferably form a set of parallelogram configuration structures 70. Preferably, there are a pair of parallelogram configuration structures 70 mounted at diametrically opposed outer portions 52 of the outer ring 18. Thus, there are concomitantly preferably a pair of brackets 54, preferably a pair of base members 78 and preferably a pair of sets of links 60 (or two pairs of links 60). The positioning of the base members 78 so that they are parallel to each other, the positioning of the brackets 54 at the opposing outer portions 52 so that they are parallel to each other and the positioning of the brackets 54 and base members 78 so that they are equidistant from each other results in the parallelogram structures 70 being generally parallel to each other with the components of each structure 70 being generally coplanar. This results in enhanced stability to the combination of the base 66, parallelogram structures 70 and outer ring 18 and also facilitates generally free translational movement of the outer ring 18 in the Z direction.

The length of the set of links 60 is relative to the stiffness of the torsion bars 68. The set of links 60 are preferably long so that the moment arm of applied Z forces is relatively large and the effective linear stiffness of the parallelogram mechanism when combined with the torsion bars 68 is kept at the desired low value. Preferably, there is less than one degree of operational rotation of the parallelogram structure 70 resulting in Z translational movement of the brackets 54, rings 16 and 18, mount 14 and centrifuge 12 of less than approximately one-half inch for a system 10 in which the rings 18 have an outer diameter of approximately forty inches, the base 66 is approximately fifteen inches square and the parallelogram structure 70 is approximately five inches high to accomodate a centrifuge weighing approximately one ton. The length of the links 60 is approximately ten times the length of the translational movement of the outer rings 18 and other structures set forth above. Thus, for a system 10 having the dimensions set forth above, the length of the links 60 is preferably approximately five inches and the deflection of the springs 20 and 22 is preferably approximately one-half inch.

The parallelogram structures 70 are preferably in a nearly collapsed position. This collapsed position in conjunction with the relative lengths of the set of links 60 and set of brackets 54 (and set of base members 78) enable the outer ring 18 (and other connected structures) to move generally translationally in the Z direction with generally no (or minimal) rotational movement thereof. In addition, the connection points 69 and the positioning of the parallelogram structures 70 at the opposing outer portions 52 generally prevent rotational movement of the outer ring 18 (and other connected structures) about the Z axis, thus providing a desired degree of angular stiffness to the system 10. The parallelogram structures 70 are preferably provided with a third set of dampers 72 which resists relative movement of the set of brackets 54 and the base 66 and generally absorbs forces thereof. The third set of dampers 72 is preferably connected at generally medial portions 74 of the set of brackets 54 to generally medial portions 76 of the set of base members 78.

The first, second and third sets of dampers 44, 46 and 72 preferably provide viscous damping. The dampers 44, 46 and 72 are preferably hydraulic types of dampers. However, other suitable types of dampers having varying degrees of stiction, hysteresis, power consumption requirements and/or control complexity may also be utilized. The selection of the type of damper utilized depends on the relative importance of these damper characteristics in the particular application in which the system 10 is to be used.

Although the base 66 is preferably generally rectangular, other suitable shapes may also be utilized for the base 66. In addition, the base 66 is preferably firmly secured to the spacecraft structure or other structure from which it is desired that the forces generated by the device be isolated. However, the base 66 may alternatively also be integral with the spacecraft structure, if desired.

A third set of strain gauges 80 is preferably connected to the set of trunnions 56 of the set of brackets 54. The trunnions 56 preferably provide a load path for the gauges 80. The third set of strain gauges 80 are preferably torque sensors located in the trunnion load path. The third set of strain gauges 80 sense torques produced by the device 12 for dynamic balance sensing. The outputs of these sensors 80 are used to control the motion of balancing masses located on the rotor of the centrifuge 12.

The system 10 also includes a first set of lock pins 82 slidably mounted in apertures 92 of the mount 14 and a second set of lock pins 84 slidably mounted in apertures 94 of the inner ring 16. A first set of recesses 86 in the inner ring 60 are placed at locations therein in general alignment with apertures 92 to generally receive first end portions 83 of the first set of lock pins 82 in order to thereby generally prevent relative movement of the mount 14 and inner ring 16. The outer ring 18 preferably similarly includes a second set of recesses 88 which are placed at locations therein in general alignment with apertures 94 so that they generally receive second end portions 85 of the second set of lock pins 84 to generally prevent relative movement between the inner ring 16 and the outer ring 18. Sets of lock pins 82 and 84 in conjunction with the recesses 86 and 88 and apertures 92 and 94 comprise a locking means 90 which interconnects and allows the rings 16 and 18 and mount 14 of the system to be immobilized in a desired relative position for transportation thereof or for spacecraft launch, etc. Locking the rings 16 and 18 and mount 14 in the desired relative position prevents damage to the springs 20, 22, the strain gauges 48, 80 and other components of the system 10 during transportation thereof or when mounting or dismounting the device 12.

The linear and angular stiffness of the system 10 provided by the unique spring structures 20 and 22 as well as the torsion bars and their related structures generally eliminate the tendency of the centrifuge 12 to wobble which results in a smaller centrifuge system overall volume and saves cost. The structures of the system 10 preferably accord the device 12 with the same degree of movement in the X, Y and Z directions. However, the degree of movement accorded in either or all directions may be altered by selection of the leaf springs and/or parallelogram structure 70 effective stiffness values. The mount 14, rings 16 and 18, springs 20 and 22 and parallelogram structures 70 as well as the base 66 are preferably composed of metal.

Accordingly, there has been provided, in accordance with the invention, a system for isolating and mounting a device which produces shock, vibration and/or other motion-related forces from a spacecraft structure or other suitable structure. It is to be understood that all the terms used herein are descriptive rather than limiting. Although the invention has been described in conjunction with the specific embodiments set forth above, many alterative embodiments, modifications and variations will be apparent to those skilled in the art in light of the disclosure set forth herein. Accordingly, it is intended to include all such alternative embodiments, modifications and variations that fall within the spirit and scope of the invention as set forth in the claims hereinbelow.

We claim:

1. A system for mounting a device and isolating motion related forces thereof, comprising:
   a mount for mounting the device thereon;
   a base;
   a set of links;
   a set of connecting means for rotatably connecting said base and said set of links, said set of connecting means resisting relative rotational movement therebetween;
   a set of brackets rotatably connected to said set of links;
   an outer ring rotatably connected to said set of brackets;
   an inner ring positioned within said outer ring, said mount positioned within said inner ring;
   a first set of springs interconnecting said inner and outer rings, said first set of springs allowing a desired degree of relative movement between said inner and outer rings; and
   a second set of springs interconnecting said inner ring and said mount, said second set of springs allowing a desired degree of relative movement between said inner ring and said mount.

2. The system of claim 1 wherein links of said set of links are positioned so that said links are generally parallel to each other.

3. The system of claim 1 wherein said base and brackets of said set of brackets are positioned so that said base and said brackets are generally parallel to each other.

4. The system of claim 1 wherein said set of links and said set of brackets and said base are dimensioned and connection points thereof located so that said set of links, said set of brackets and said base form a generally parallelogram configuration structure.

5. The system of claim 4 wherein said set of links, said set of brackets and said base are positioned so that the parallelogram configuration structure is in a nearly collapsed position.

6. The system of claim 1 wherein said set of links is two pairs of links and said set of brackets is a pair of brackets, said pair of brackets positioned at diametrically opposed locations on said outer ring.

7. The system of claim 1 further including a set of trunnions mounted on said outer ring for rotatably interconnecting said outer ring and said set of brackets.

8. The system of claim 1 wherein said set of connecting means includes a torsion bar.

9. The system of claim 1 wherein said first set of springs includes a first set of flexure members allowing relative movement of said inner and outer rings in generally only a radial direction.

10. The system of claim 9 wherein said first set of flexure members includes a first set of single bar leaf springs.

11. The system of claim 10 wherein said first set of single bar leaf springs includes a first set of auxiliary torque reaction springs.

12. The system of claim 10 further including a first set of dampers mounted on said first set of leaf springs.

13. The system of claim 1 wherein said second set of springs includes a second set of flexure members allowing relative movement of said inner ring and said mount in generally only a transverse direction.

14. The system of claim 13 wherein said second set of flexure members includes a second set of single bar leaf springs.

15. The system of claim 14 wherein said second set of single bar leaf springs includes a second set of auxiliary torque reaction springs.

16. The system of claim 14 further including a second set of dampers mounted on said second set of leaf springs.

17. The system of claim 1 wherein said inner and outer rings are positioned and oriented so that they are generally coplanar.

18. The system of claim 1 further including a locking means interconnecting said mount and said inner and outer rings for preventing relative movement therebetween.

19. The system of claim 18 wherein said locking means includes:
   a first set of lock pins slidably mounted in said mount;
   said inner ring having a recess at a location therein to receive an end portion of said first set of pins therein;
   a second set of pins slidably mounted in said inner ring;
   said outer ring having a recess positioned to receive an end portion of said second set of pins therein.

20. The system of claim 1 further including a first set of strain gauges mounted on said first set of springs.

21. The system of claim 1 further including a second set of strain gauges mounted on said second set of springs.

22. The system of claim 1 further including a third set of strain gauges mounted on a set of trunnions rigidly interconnecting said set of brackets and said outer ring.

* * * * *